United States Patent [19]
Lockwood, Jr.

[11] 3,949,548
[45] Apr. 13, 1976

[54] GAS TURBINE REGENERATION SYSTEM

[76] Inventor: Hanford N. Lockwood, Jr., 801 N. Humboldt St., San Mateo, Calif. 94401

[22] Filed: June 13, 1974

[21] Appl. No.: 478,921

[52] U.S. Cl. .............................. 60/39.15; 60/39.52
[51] Int. Cl.² ..................... F02C 7/08; F02C 7/02
[58] Field of Search ...... 60/39.52, 39.66, 317, 39.5, 60/39.15, 39.41

[56] References Cited
UNITED STATES PATENTS

| | | | |
|---|---|---|---|
| 2,303,381 | 12/1942 | New | 60/39.52 |
| 2,441,751 | 5/1948 | Broggi | 60/39.52 |
| 2,541,532 | 2/1951 | Mosser | 60/39.52 |
| 2,547,093 | 4/1951 | Ray | 60/39.52 |
| 2,639,579 | 5/1953 | Willgoos | 60/39.66 |
| 2,826,895 | 3/1958 | English | 60/39.66 |

Primary Examiner—Carlton R. Croyle
Assistant Examiner—L. T. Casaregola
Attorney, Agent, or Firm—Robert H. Eckhoff

[57] ABSTRACT

The gas turbine regeneration package is designed to increase the efficiency of gas turbines with exhaust gas recirculation. Besides the gas turbine itself, four basic components are used to make up the efficiency package: the first is an exhaust gas cooler, the second is an exhaust gas cooling fan, the third is a recycle exhaust gas regenerator and finally there is a compressed ambient air regenerator. Other turbines have ambient air regenerators but they are not used in conjunction with a recycled gas stream so they tend to have high concentrations of $NO_x$ in their exhaust gases. The basic advantage of this regenerator package includes the following:

a. increased efficiency of the turbine at full and reduced power settings,
b. cooler turbine exhaust is emitted to the atmosphere,
c. better control over the combustion process particularly the production of oxides of nitrogen,
d. reduced noise, and
e. the use of ambient air as part of the engine heat sink.

11 Claims, 3 Drawing Figures

GAS TURBINE REGENERATION SYSTEM

BACKGROUND OF THE INVENTION

Turbines built in the past have been designed to operate at constantly high power settings and have lacked the means of operating efficiently over their turndown range, limiting their application in the field of ground transportation. They have also been designed without exhaust gas recirculation so they have not had good flame control and thus relatively large quantities of $NO_x$ are produced in the exhaust and emitted to the atmosphere.

SUMMARY OF THE INVENTION

It is an object of this invention to increase the efficiency of gas turbines at full power and at various turndown settings while at the same time reducing their adverse environmental characteristics. This invention offers three basic configurations which allow the regeneration system to be applied in such a way as to maximize the desired engine operating characteristics depending upon its application. The invention employs in one configuration a gas turbine with exhaust gas circulation which is used for flame control in the combustion chamber. This turbine is also used in a constant speed application. It includes a recirculating exhaust cooler to increase the density of the recycled gas handled by the recirculation compressor improving the compressor's efficiency.

In a second configuration as gas turbine includes exhaust gas circulation for flame control in the combustion chamber. It is also used in limited turn down applications where turbine nozzle inefficiencies are starting to increase the exhaust gas temperature. The extra heat in the exhaust is transferred to the compressed recirculated exhaust before it gets to the combustor. In addition, some of the cooler exhaust is cooled still further by the recycled exhaust cooler before it is compressed.

In the third configuration, a gas turbine with exhaust gas circulation is used for flame control in the combustion chamber, particularly in a maximum turn down application where turbine nozzle inefficiencies are greatly increasing the exhaust gas temperature. The exhaust gas is split into two streams. One stream transfers its heat to the compressed recirculated exhaust before it gets to the combustor. The other stream transfers its heat to the compressed ambient air before it gets to the combustor. A portion of both gas streams is collected and sent to the recirculated exhaust cooler to be cooled further before it is compressed. In each case described, the efficiency of the gas turbine is increased by using the recycled exhaust cooler and the necessary regenerators to transfer heat where it can be added to the work producing area of the turbine. Also this design allows for pollution free combustion by cleaning up the flame through careful air fuel mixing and exhaust gas recirculation. All flame conditioning is done ahead of the work so no energy is wasted cleaning up the flame after the work has been performed.

DESCRIPTION OF THE PREFERRED EMBODIMENT

Figure 1:
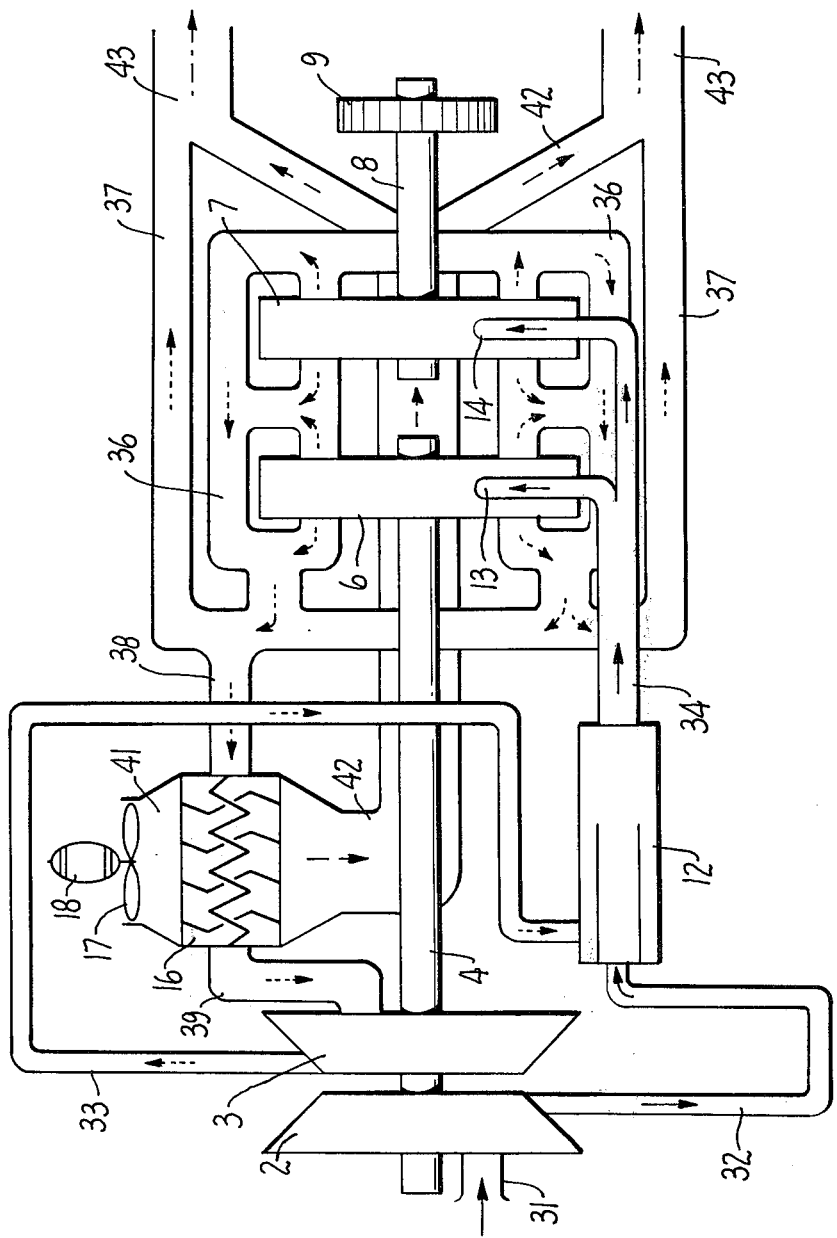
FIG. 1 is a diagrammatic showing of the application of the exhaust gas cooler on a turbine.

Before proceeding to a detailed disclosure of the preferred embodiment, the following general observations are made as to each of the major components of the efficiency package.

Exhaust Gas Cooler

The exhaust gas cooler is designed to cool the recycled exhaust gas before it gets to the compressor. This increases the density of the gas making the compressor more efficient. It also provides a heat sink for the engine that improves its thermodynamic efficiency. Since the heat is carried away by air or some other outside stream, there is no contamination of the stream by the exhaust and the pollution effects of the engine are reduced by the percentage of exhaust gas recirculated within the engine.

The recycled exhaust gas cooler is a heat exchanger which takes heat from the recycled exhaust gas and transfers it to an ambient air stream that is moving through the other side of the exchanger. The heat exchanger may be of the tube and shell type with the exhaust gas passing through the tubes and ambient air passing in the shell outside the tubes. Another design would be one where the exhaust gas passes through the shell of the heat exchanger while the ambient air passes through the tubes. The exchanger can be designed with finned tubes or it can be a periodic flow design.

The cooling medium in most cases would be ambient air forced through the heat exchanger. In some special cases, other mediums can be used. In marine applications water can be used as the coolant or in special applications a low pressure heat transfer oil may be used. If air is used as the cooling medium, it can be mixed with the exhaust, that is not being recirculated, before it is vented to the atmosphere thus reducing the gas mixture's temperature to a safe level for personnel near the operating turbine.

Exhaust Gas Cooler Fan

If ambient cooling air is used, then a fan must be provided to force the air through the heat exchanger and on to the atmospheric exhaust lines. This fan should be a constant speed unit to supply a constant amount of cooling air. This will increase the cooling efficiency of the exhaust cooler during low power settings when greater cooling efficiency is required. In some cases the forward motion of a vehicle in which the turbine is mounted can force air through the exhaust cooler lowering the power required to run the cooler fan.

In marine applications, a constant speed cooling water pump can be used or the forward motion of the vessel may provide the water circulation needed to reduce the recycled exhaust gas temperature. An efficiency of approximately 4% per 500°F. drop in recycled exhaust gas temperatures can be expected using the recycled exhaust cooler and fan.

Recycled Exhaust Gas Regenerator

The recycled exhaust gas regenerator is a heat exchanger mounted in the turbine exhaust system. It is designed to transfer heat in the turbine exhaust to the compressed recycled exhaust gas before it gets to the combustor. During partial throttle settings the turbine nozzles lose some of their efficiency and this results in higher exhaust gas temperatures. The extra exhaust heat can be transferred to the compressed recycled exhaust gas, reducing the fuel consumption of the engine by the percentage of heat transferred.

The exhaust gas regenerator can be either a shell and tube type of heat exchanger or a periodic flow design. It is designed to take all the exhaust gas from the turbines and pass it through the shell side of the tube and shell heat exchanger. At the same time the compressed recycled gas from the compressor passes through the tubes in the exchanger picking up some of the heat in the exhaust gas. Some of the exhaust gas goes from the regenerator to the exhaust gas cooler to be recycled. The remainder proceeds to the exhaust pipes where it joins with the ambient air from the exhaust gas cooler and mixes before it reaches the atmosphere.

This particular configuration of the engine is designed to provide the most pollution free performance. The recycled exhaust gas will reduce the formation of oxides of nitrogen by reducing the amount of high oxygen content excess air. By omitting the regenerator on the ambient air supply to the combustor, the cooler ambient air will reduce the temperature at the base of the flame, also reducing oxides of nitrogen.

Ambient Air Regenerator

The ambient air regenerator is a heat exchanger mounted in the turbine exhaust system. It is designed to transfer heat in the turbine exhaust to the compressed ambient air before it gets to the combustor. As in the case of the exhaust gas regenerator, the ambient air regenerator is most effective during partial throttle settings. The extra heat in the exhaust gas that is transferred to the compressed ambient air reduces the fuel consumption in the engine by the percentage of heat transferred.

The ambient air regenerator can be either a shell and tube type of heat exchanger or a periodic flow design. When the ambient air regenerator is used in conjunction with the recycled exhaust gas regenerator, the exhaust streams from the turbines are split so that approximately equal amounts flow to each regenerator. Different designs may change the ratio of exhaust gas to each of the regenerators, however, for best efficiency all the gas from the turbine will flow through one or the other. At the same time that approximately half of the turbine exhaust is passing through the heat exchanger shell, the compressed ambient air is passing through the tubes and being heated by the exhaust gases. As the cooled exhaust gases leave the ambient air regenerator, some of the exhaust gas mixes with exhaust gas from the recycled exhaust gas regenerator and goes on to the recycled exhaust gas cooler to be recycled. The remainder proceeds to the exhaust pipes where it joins with the ambient air from the exhaust gas cooler and mixes before it reaches the atmosphere.

This configuration of the engine is designed to maximize the economy of the engine. It will still provide pollution free performance compared to other engines, however, some increase in $NO_x$ can be expected because of the introduction of preheated air at the base of the combustor flame.

The devices of this invention are designed to be added to gas turbine type engines with some portion of the exhaust recycled back to the combustor. Referring to FIG. 1, a schematic diagram is shown of a gas turbine engine consisting of an ambient air compressor 2, a recycled exhaust gas compressor 3 and a compressor drive turbine 6 mounted on a shaft 4. The power output of the unit is taken from the power output turbine 7 mounted on shaft 8 on which a gear 9 is mounted. The compressors and turbines on these gas turbines can have multiple stages.

The air flow through the gas turbine within the scope of this invention starts with the ambient air inlet 31 where atmospheric air enters the ambient air compressor 2 and leaves the compressor through duct 32 to the combustor 12. At the same time recycled exhaust gas is compressed in the recycled gas compressor 3 and passes through duct 33 to the combustor assembly 12. The combustion products move through duct 34 and are admitted through compressor drive turbine nozzle 13 to the compressor drive turbine 6 and through the power output turbine nozzle 14 to the power output turbine 7. The flow to the turbines can be either parallel or series. The parallel flow type is shown.

After transmitting the power to the turbines, the exhaust gas is collected in manifold 36 where it splits into two streams. One exhaust stream moves into duct 37 where it will be vented to the atmosphere while the other exhaust stream enters duct 38 where it proceeds to the recycled exhaust cooler 16. The recycled exhaust gas loses its heat by transferring it to the cooling medium through the heat exchanger. The recycled exhaust gas then enters the recycled exhaust gas compressor through duct 39.

The heat from the exhaust gas is transferred to air, water in marine use or some type of heat transfer fluid. In this case a fan 17 driven by a motor 18 provides ambient cooling air to the recycled exhaust cooler 16 through duct 41. Upon gaining the heat lost from the recycled exhaust, the air enters duct 42 where it is sent to mix with the turbine exhaust being vented to the atmosphere at exhaust pipe 43. This cools the exhaust being vented to the atmosphere preventing any overheating of the nearby area.

Figure 2:
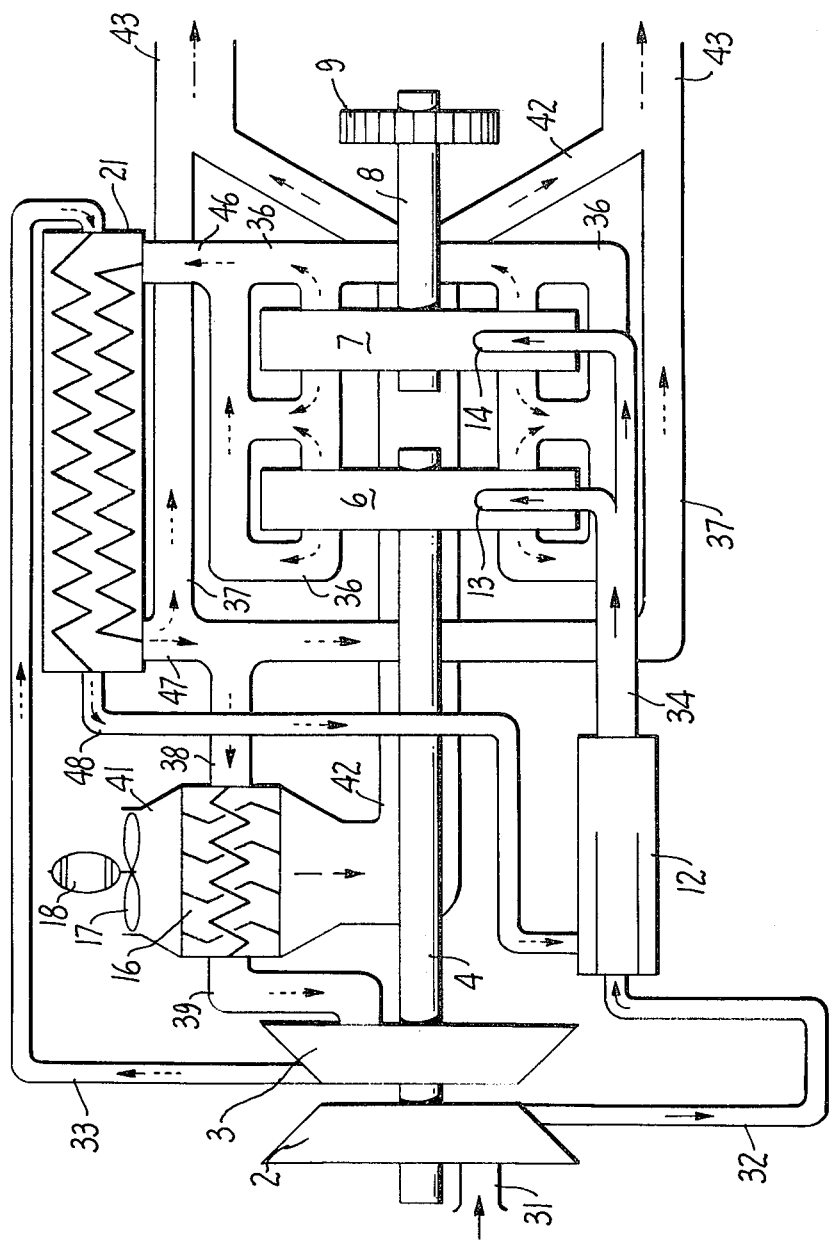
FIG. 2 is a diagrammatic showing of the application of the exhaust gas cooler in conjunction with the exhaust gas regenerator on a turbine.

In FIG. 2 a recycle exhaust gas regenerator 21 has been added to the gas turbine engine described in FIG. 1. In this schematic showing, the recycled compressed gas from the recycle gas compressor passes through a heat exchanger called the exhaust gas regenerator. As in FIG. 1, all the exhaust gas from the turbine is collected in the exhaust duct 36. It then moves through duct 46 to the recycle exhaust gas heat exchanger 21. The exhaust gas transfers its heat to the compressed recycled gas in duct 33 which comes from the recycle exhaust gas compressor 3. The cooled exhaust gas leaves the heat exchanger at 47 and splits into two streams. One stream of exhaust gas proceeds down duct 37 to the atmosphere. The second stream proceeds down duct 38 to be further cooled by the recycled exhaust cooler 16 as shown in FIG. 1.

The compressed recycled gas leaves the recycled exhaust gas compressor 3 and enters the exhaust gas heat exchanger 21 through duct 33. Here it picks up the excess heat from the exhaust stream passing through the same heat exchanger. Having picked up the maximum possible heat it exits from the heat exchanger 21 through duct 48 and proceeds to the combustor assembly 12. The heat that the recycled compressed gas picks up, reduces the amount of heat required for operation of the engine that must be applied by fuel entering the combustor 21.

Figure 3:
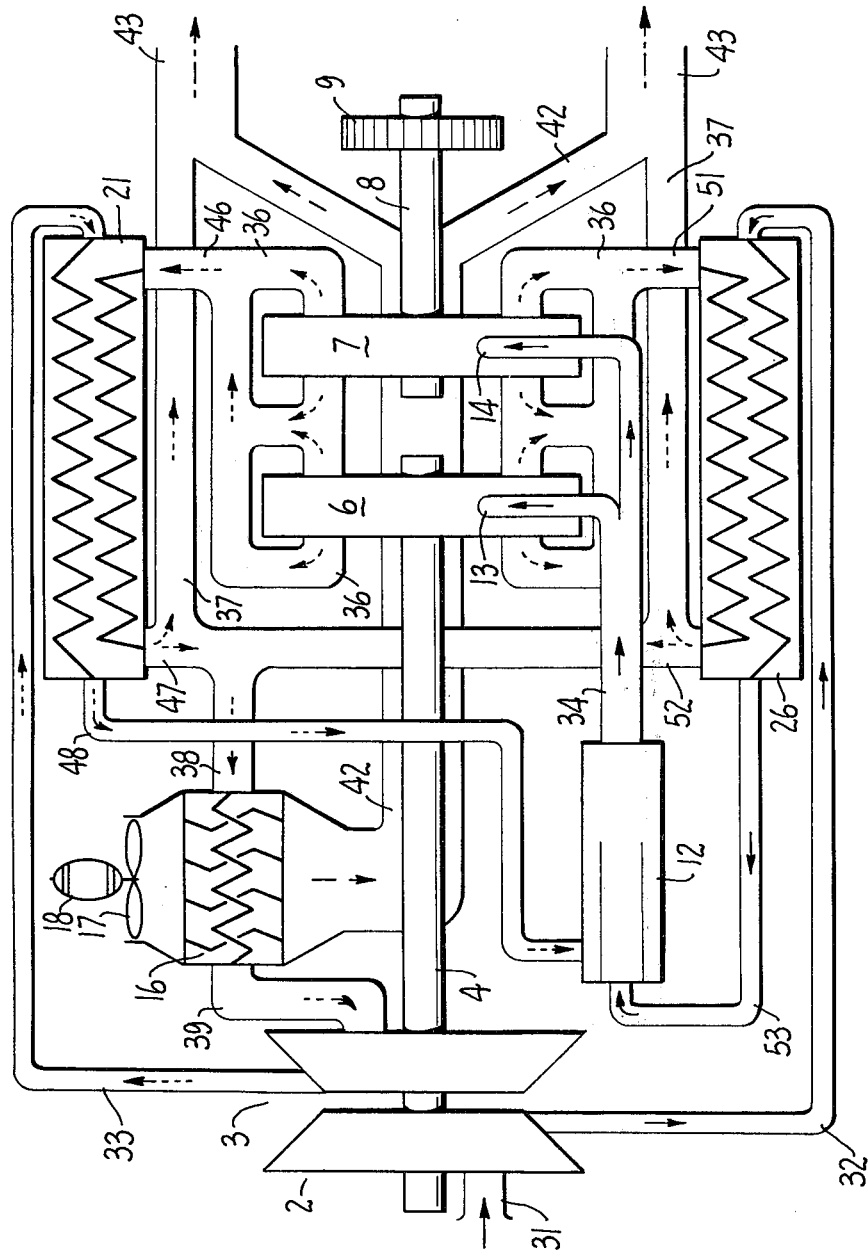
FIG. 3 is a diagrammatic showing of the application of the exhaust gas cooler in conjunction with both the exhaust gas regenerator and the ambient air regenerator on a turbine.

FIG. 3 is a more thermodynamically efficient version of a gas turbine engine than the units shown in FIGS. 1 and 2. Like FIGS. 1 and 2, it has a recycled exhaust cooling system 16 and a recycled exhaust gas regenerator 21. It also has a regenerator in the compressed ambient air system. In FIG. 3 exhaust gas from the turbines is collected in the exhaust ducts 36. It splits into two streams. One stream moves through duct 46 and goes to the recycled exhaust gas regenerator 21. The second stream proceeds through duct 51 into the ambient compressed gas regenerator 26. It transfers its heat to the compressed ambient air that has come from the ambient air compressor 2 to the regenerator 26 through duct 32. The exhaust leaves the ambient air regenerator through duct 52 where it joins the exhaust stream from the recycled gas regenerator 21 which is proceeding through duct 47. The combined streams are then split again into two streams. One exhaust stream proceeds down duct 37 to the atmosphere. The second exhaust stream proceeds down duct 38 to be further cooled by the recycled exhaust cooler 16 as shown in FIG. 1.

At the same time the compressed ambient air leaves the ambient air compressor 2 and enters the ambient air heat exchanger 26 through duct 32. Here it picks up the excess heat from the exhaust stream passing through the same heat exchanger. Having picked up the maximum possible heat, it exits from the heat exchanger 26 through duct 53 and proceeds to the combustor assembly 12. The heat that the ambient air picks up reduces the amount of heat required for operation of the engine that must be supplied by fuel entering the combustor 12.

I claim:

1. A gas turbine, comprising: a power output shaft; a power turbine mounted on the power output shaft for driving the power output shaft; a compressor drive shaft; a compressor drive turbine mounted on the compressor drive shaft to drive the compressor drive shaft; an ambient air compressor mounted on the compressor drive shaft to be driven thereby; a turbine exhaust gas compressor mounted on the compressor drive shaft to be driven thereby; a combustion chamber; means connecting the ambient air compressor to the combustion chamber; fuel supply means connected with the combustion chamber to supply fuel thereto; means connected between the combustion chamber and both said turbines to supply products of combustion thereto to drive the turbines; exhaust manifold means connected in common with both said turbines to collect exhaust gases therefrom; exhaust gas cooling means having means to circulate ambient cooling fluid therethrough; means connected between the manifold means and the cooling means to supply at least a portion of the collected exhaust gases to the cooling means in heat exchange relationship with the cooling fluid circulated therethrough; means connected between the cooling means and the exhaust gas compressor to supply cooled exhaust gas to the exhaust gas compressor for compression of the cooled exhaust gases; means to supply the cooled, compressed exhaust gases to the combustion chamber for flame control in the combustion chamber to reduce oxides of nitrogen; and means to mix the cooling fluid with exhaust gas exhausted to the atmosphere.

2. A gas turbine, comprising: a combustion chamber; a power output shaft; a power turbine mounted on the power output shaft; a compressor drive shaft; an ambient air compressor mounted on the compressor drive shaft; an exhaust gas compressor mounted on the compressor drive shaft; a compressor drive turbine mounted on the compressor drive shaft to drive the ambient air and exhaust gas compressors; means connected between the combustion chamber and the turbines to supply products of combustion thereto to drive the turbines; exhaust manifold means connected in common with the turbines to collect the exhaust gases therefrom; and exhaust gas cooling means connected to receive at least a portion of the collected exhaust gases to cool the exhaust gases prior to supply of the exhaust gases to the exhaust gas compressor, said cooling means including means for circulating ambient cooling fluid under pressure in heat exchange relationship with the exhaust gas at a substantially constant rate at all speeds of the turbines.

3. A turbine as in claim 2, wherein: said power output shaft and said compressor drive shaft are coaxial with one another; said turbines are connected in parallel with one another for receiving products of combustion from the combustion chamber; and said means for circulating ambient cooling fluid comprises a fan.

4. A turbine as in claim 3 including a heat exchanger; means connecting said manifold with said heat exchanger for circulation of all of said exhaust gases from the turbines through the heat exchanger; and means connecting the heat exchanger with the exhaust cooling means for circulation of a part of the exhaust through the cooling means, the remainder of the exhaust gases being exhausted to atmosphere.

5. A turbine as in claim 4, including means connecting the exhaust gas compressor with the heat exchanger for circulation of cooled, compressed exhaust gases through the heat exchanger in heat exchange relationship with the exhaust gases circulated therethrough from the manifold, and means for then conveying the cooled, compressed exhaust gases to the combustion chamber for flame control.

6. A turbine as in claim 2, including exhaust discharge means connecting the manifold with atmosphere for discharging a portion of the exhaust gas from the turbines to the atmosphere; and means connecting the exhaust cooling means with the exhaust discharge means for mixing cooling fluid with the exhaust prior to discharge thereof to atmosphere.

7. A turbine as in claim 5, including exhaust discharge means connecting the manifold with atmosphere for discharging a portion of the exhaust gas from the turbines to the atmosphere; and means connecting the exhaust cooling means with the exhaust discharge means for mixing cooling fluid with the exhaust prior to discharge thereof to atmosphere.

8. A turbine as in claim 6, including a pair of exhaust manifolds each connected in common with said turbines; and said turbines connected in parallel with one another for receiving products of combustion from the combustion chamber.

9. A turbine as in claim 5, including exhaust discharge means connecting the manifold with atmosphere for discharging a portion of the exhaust gas from the turbines to the atmosphere; and means connecting the exhaust cooling means with the exhaust discharge means for mixing cooling fluid with the exhaust prior to discharge thereof to atmosphere; a pair of exhaust manifolds each connected in common with said turbines; and said turbines connected in parallel with one another for receiving products of combustion from the combustion chamber.

10. A turbine as in claim 9, including a second heat exchanger; and means connecting one of said exhaust manifolds with one of the heat exchangers and means connecting the other exhaust manifold with the other heat exchanger, whereby the exhaust from the turbines is split into two streams, with one stream going to each heat exchanger.

11. A turbine as in claim 10 wherein means is connected between the ambient air compressor and the second heat exchanger for circulation of compressed ambient air through the second heat exchanger in heat exchange relationship with the exhaust gas therein; and means connected with said heat exchangers to combine at least a portion of the exhaust gases circulated therethrough and supply the exhaust gases to the exhaust gas cooling means.

* * * * *